United States Patent
Lundy et al.

Patent Number: 5,476,893
Date of Patent: Dec. 19, 1995

[54] USE OF NUCLEUS-BROMINATED PHTHALIC ACID ANHYDRIDE FOR STABILIZING THERMOPLASTIC POLYCARBONATES AGAINST THE EFFECT OF GAMMA-RAYS

[75] Inventors: Charles Lundy, Krefeld; Ulrich Grigo, Kempen; Alexa Sommer, Bergisch-Gladbach; Klaus Horn, Krefeld; Klaus Sommer, Bergisch Gladbach; Arno Becker, Krefeld, all of Germany

[73] Assignee: Bayer Corporation, Pittsburgh, Pa.

[21] Appl. No.: 124,904

[22] Filed: Sep. 21, 1993

Related U.S. Application Data

[63] Continuation of Ser. No. 893,971, Jun. 4, 1992, abandoned.

[30] Foreign Application Priority Data

Jun. 12, 1991 [DE] Germany ............... 41 19 329.6

[51] Int. Cl.$^6$ ................................... C08K 5/09
[52] U.S. Cl. ............... 524/288; 524/110; 524/367; 524/368; 524/467; 523/136
[58] Field of Search ............ 523/136; 524/110.112, 524/264, 288, 307, 368, 378, 466, 467, 469, 367

[56] References Cited

U.S. PATENT DOCUMENTS

| | | | |
|---|---|---|---|
| 3,535,300 | 10/1970 | Gable | 260/29.1 |
| 3,873,567 | 3/1975 | Cyba | 524/466 |
| 4,208,489 | 6/1980 | Schmidt et al. | 525/146 |
| 4,624,972 | 11/1986 | Nace | 523/136 |
| 4,673,699 | 6/1987 | Krishnan et al. | 524/94 |
| 4,804,692 | 2/1989 | Lundy et al. | 523/137 |
| 4,873,271 | 10/1989 | Lundy et al. | 523/136 |
| 4,874,802 | 10/1989 | Lundy et al. | 524/94 |
| 4,904,710 | 2/1990 | Nace | 523/137 |
| 4,912,158 | 3/1990 | Bohen et al. | 524/288 |
| 4,963,598 | 10/1990 | Krishnan et al. | 523/137 |
| 5,006,572 | 4/1991 | Lundy et al. | 523/136 |
| 5,280,050 | 1/1994 | Powell et al. | 523/136 |

FOREIGN PATENT DOCUMENTS

| | | |
|---|---|---|
| 152012 | 8/1985 | European Pat. Off. |
| 0258593 | 3/1988 | European Pat. Off. |
| 0296473 | 12/1988 | European Pat. Off. |
| 296473 | 12/1988 | European Pat. Off. |
| 0359366 | 3/1990 | European Pat. Off. |
| 0376289 | 7/1990 | European Pat. Off. |
| 376289 | 7/1990 | European Pat. Off. |
| 1273071 | 5/1972 | United Kingdom |

*Primary Examiner*—Tae H. Yoon
*Attorney, Agent, or Firm*—Joseph C. Gil; Aron Preis

[57] ABSTRACT

The invention relates to the use of nucleus-brominated phthalic acid derivatives, optionally in combination with polyalkylene oxides corresponding to formula (V)

$$R-O-(CH_2-\underset{\underset{R'}{|}}{C}H-O)_x-R \qquad (V)$$

in which
R is H, $C_{1-6}$ alkyl, tetrahydropyranyl or a silyl group,
R' is H or $C_{1-6}$ alkyl and
x is an integer of 1 to 100,
for stabilizing thermoplastic polycarbonates against the effect of γ-rays.

2 Claims, No Drawings

USE OF NUCLEUS-BROMINATED PHTHALIC ACID ANHYDRIDE FOR STABILIZING THERMOPLASTIC POLYCARBONATES AGAINST THE EFFECT OF GAMMA-RAYS

This application is a continuation of application Ser. No. 07/893,971 filed Jun. 4, 1992, now abandoned.

This invention relates to the use of nucleus-brominated phthalic acid derivatives for stabilizing thermoplastic polycarbonates against the effects of gamma-rays.

By virtue of their physical properties, thermoplastic polycarbonates are suitable for medical applications. For these applications, the corresponding articles and moldings of the thermoplastic polycarbonates have to lend themselves to repeated sterilization without being degraded. Sterilization is carried out by exposure to γ-rays because the polycarbonates are permanently damaged by treatment with steam.

However, long-term exposure to γ-rays also damages the polycarbonates by turning them yellow in color. This damage by γ-rays is largely suppressed by the use in accordance with the invention of nucleus-brominated phthalic acid derivatives.

There are various methods for making thermoplastic polycarbonates resistant to the effect of γ-rays (see, for example, EP-OS 0 376 289, U.S. Pat. Nos. 4,624,972, 4,904,710, EP-OS 0 152 012, EP-OS 0 296 473 (Mo 2971), U.S. Pat. No. 4,804,692 (Mo 3005), U.S. Pat. No. 4,963,598 (Mo 3047), U.S. Pat. No. 4,874,802 (Mo 3071), EP 0 384 110 (U.S. Pat. No. 5,006,572) (Mo 3170) and U.S. Pat. No. 4,873,271 (Mo 3208)). Nucleus-brominated phthalic acid derivatives are not mentioned therein.

EP-OS 0 376 289 describes the combined use of polyalkylene glycols with bromine-containing oligocarbonates for protecting polycarbonates against radiation. By contrast, the combination according to the invention of tetrabromophthalic anhydride with polypropylene glycols affords advantages, as does tetrabromophthalic anhydride alone, over brominated oligocarbonate alone in the stabilization of polycarbonates against γ-rays.

On the other hand, it is known that brominated phthalic acid derivatives can be added to polycarbonates for flame-proofing purposes (see, for example, DE-OS 1 802 184 (Mo 981) or U.S. Pat. No. 3,535,300, DE-OS 2 013 496, U.S. Pat. No. 3,873,567, DE-PS 2 740 850 (Le A 18 401), U.S. Pat. No. 4,208,489 and U.S. Pat. No. 4,673,699). The use of brominated phthalic acid derivatives for stabilizing polycarbonate moldings against γ-rays is neither discussed nor suggested in these literature references.

Nucleus-brominated phthalic acid derivatives are, preferably brominated phthalic anhydrides, phthalic acid imides, phthalic acid diesters and phthalic acid diamides, the bromine substituents occupying 1, 2, 3 or 4 positions in the aromatic phthalic acid component.

Accordingly, suitable brominated phthalic anhydrides are those corresponding to formula (I)

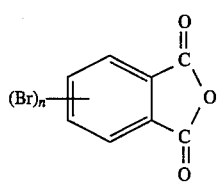

(I)

in which n is 1, 2, 3 or 4.

Suitable nucleus-brominated phthalic acid imides are those corresponding to formula (II)

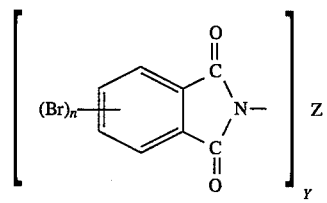

(II)

in which n is 1, 2, 3 or 4,

Y is 1, 2, 3, or 4 and

Z is hydrogen or a one-, two-, three- or four-bond organic radical, for example a $C_{1-18}$ alkyl or $C_{2-18}$ alkylene radical, a three-bond $C_{3-18}$ alkane radical or a four-bond $C_{4-18}$ alkane radical or, for example, a $C_{5-6}$ cycloalkyl or $C_{5-6}$ cycloalkylene radical or, for example a $C_{7-12}$ aralkyl radical.

Suitable alkyl radicals are, for example, methyl, ethyl, propyl, isopropyl and butyl.

Suitable alkylene radicals are, for example, ethylene, propylene, butylene and 1,6-hexamethylene.

Suitable cycloalkyl radicals and cycloalkylene radicals are, for example, cyclohexyl, cyclopentyl, cyclohexylene and cyclopentylene.

Suitable aralkyl radicals are, for example, benzyl and phenethyl.

Suitable nucleus-brominated phthalic acid diesters are those corresponding to formula (III)

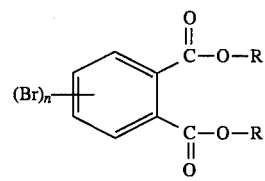

(III)

in which n is 1, 2, 3 or 4 and

R is a $C_{1-18}$ alkyl, $C_{5-6}$ cycloalkyl, $C_{6-10}$ aryl or $C_{7-12}$ aralkyl radical.

Suitable nucleus-brominated phthalic acid diamides are those corresponding to formula (IV)

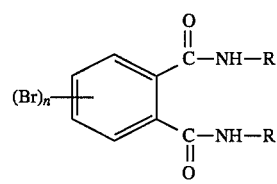

(IV)

in which n is 1, 2, 3 or 4 and

R is a $C_{1-18}$ alkyl, $C_{5-6}$ cycloalkyl, $C_{6-10}$ aryl or $C_{7-12}$ aralkyl.

Suitable alkyl radicals in (III) and (IV) are methyl, ethyl, propyl and butyl.

Suitable cycloalkyl radicals in (III) and (IV) are cyclohexyl and cyclopentyl.

Suitable aryl radicals in (III) and (IV) are phenyl and naphthyl.

Suitable aralkyl radicals in (III) and (IV) are benzyl, methylbenzyl, ethylbenzyl and propylbenzyl.

One example of a compound corresponding to formula (I) is tetrabromophthalic anhydride.

One example of a compound corresponding to formula (II) is hexamethylenediamine-bis-tetrabromophthalic acid diimide.

Examples of compounds corresponding to formula (III) are tetrabromophthalic acid dimethyl ester and diethyl ester.

One example of a compound corresponding to formula (IV) is tetrabromophthalic acid di-(N-phenyl)-amide.

To sterilize the thermoplastic polycarbonates, the nucleus-brominated phthalic acid derivatives are used in quantities of 0.01% by weight to 10% by weight, preferably in quantities of 0.1% by weight and to 5.0% by weight and, more preferably, in quantities of 0.5% by weight to 1.5% by weight, based on the weight of thermoplastic polycarbonate and nucleus-brominated phthalic acid derivative.

The thermoplastic polycarbonates to be stabilized in accordance with the invention are known from the literature.

Polycarbonates to be stabilized in accordance with the invention are thermoplastic aromatic homopolycarbonates and copolycarbonates based, for example, on one or more of the following diphenols: hydroquinone, resorcinol, dihydroxydiphenyls, bis-hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfoxides, bis-(hydroxyphenyl)-sulfones, $\alpha,\alpha'$-bis-(hydroxyphenyl)-diisopropylbenzenes and nucleus-alkylated and nucleus-halogenated compounds thereof. These and other suitable diphenols are described, for example, in U.S. Pat. Nos. 3,028,365, 3,275,601, 3,148,172, 3,062,781, 2,991,273, 3,271,367, 2,999,835, 4,982,014, and 2,999,846; in DE-OSS 1 570 703, 2 063 050, 2 063 052, 2 211 956, 2 211 957, in FR-PS 1 561 518 and in the book by H. Schnell entitled "Chemistry and Physics of Polycarbonates", Interscience Publishers, New York, 1964.

Preferred diphenols are, for example, 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, $\alpha,\alpha'$-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl- 4-hydroxyphenyl)-methane, 2,2-bis-(3,5-dimethyl-4-hydroxyphenyl)-methane, bis-(3,5-dimethyl-4-hydroxyphenyl)-sulfone, 2,4-bis-(3,5-dimethyl-4-hydroxyphenyl)-2-methylbutane,1,1-bis-(3,5-dimethyl-4-hydroxyphenyl)-cyclohexane, $\alpha,\alpha'$-bis-(3,5-dimethyl-4-hydroxyphenyl)-p-diisopropylbenzene, 2,2-bis-(3,5-dichloro-4-hydroxyphenyl)-propane and 1,1-bis-(4-hydroxyphenyl)-3,3,5-trimethyl cyclohexane.

Particularly preferred diphenols are, for example, 2,2-bis-(4-hydroxyphenyl)-propane, 2,2-bis-(3,5-dimethyl- 4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane and 1,1-bis-(4-hydroxyphenyl)-3,3,5-trimethyl cyclohexane.

Preferred aromatic polycarbonates are those based on one or more of the diphenols mentioned as preferred. Copolycarbonates based on 2,2-bis-(4-hydroxyphenyl)-propane and one of the other diphenols mentioned as particularly preferred are particularly preferred. Polycarbonates alone based on 2,2-bis-(4-hydroxyphenyl)-propane or 1,1-bis-(4-hydroxyphenyl)-3,3,5-trimethyl cylohexane are also particularly preferred.

The aromatic polycarbonates may be produced by known methods, for example by the melt transesterification process from bisphenol and diphenyl carbonate and the two-phase interfacial process from bisphenols and phosgene, as described in the literature cited above.

The aromatic polycarbonates may be branched by the incorporation of small quantities, preferably between 0.05 and 2.0 mol-% (based on the diphenols used), of trifunctional or more than trifunctional compounds, for example those containing three or more than three phenolic hydroxy groups.

Polycarbonates of this type are described, for example, in DE-OSS 1 570 533, 1 595 762, 2 116 974, 2 113 347, in GB-PS 1,079,821, in U.S. Pat. No. 3,544,514 and in DE-OS 2 500 092.

Some of the compounds containing three or more than three phenolic hydroxy groups which may be used are, for example, phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl] -propane, 2,4-bis-(4-hydroxyphenylisopropyl)-phenol, 2,6-bis-(2'-hydroxy-5'-methylbenzyl)-4-methylphenol, 2-( 4-hydroxyphenyl)-2-(2,4-dihydroxyphenyl)-propane,hexa-(4-( 4-hydroxyphenylisopropyl)-phenyl)-orthoterephthalic acid ester, tetra-(4-hydroxyphenyl)-methane, tetra-(4-(4-hydroxyphenylisopropyl)-phenoxy)-methane and 1,4-bis-((4',4 "-dihydroxytriphenyl)-methyl)-benzene. Some of the other trifunctional compounds are 2,4-dihydroxybenzoic acid, trimesic acid, cyanuric chloride and 3,3-bis-(4-hydroxy- 3-methylphenyl)-2-oxo-2,3-dihydroindole.

The aromatic polycarbonates should generally have average weight average molecular weights $\overline{M}_w$ in the range from 10,000 to more than 200,000 and preferably in the range from 20,000 to 80,000, as determined by measurement of the relative viscosity in $CH_2Cl_2$ at 25° C. and at a concentration of 0.5 g in 100 ml $CH_2Cl_2$.

Chain terminators, such as for example phenol or halophenols, in the calculated quantities are used in known manner for establishing the molecular weight $\overline{M}_w$.

The nucleus-brominated phthalic acid derivatives are incorporated in the polycarbonates to be stabilized in known manner.

The nucleus-brominated phthalic acid derivatives may even be used in combination with polyalkylene oxides corresponding to formula (V)

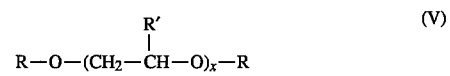

(V)

in which

R is H, $C_{1-6}$ alkyl, tetrahydropyranyl or a silyl group,

R' is H or $C_{1-6}$ alkyl and x is an integer of 1 to 100 and preferably 10 to 60.

The quantity of (V) in the polycarbonate to be stabilized is also 0.01 to 10% by weight and preferably 0.1 to 5.0% by weight, based on the weight of the thermoplastic polycarbonate and polyalkylene oxide (V).

Accordingly, the present invention also relates to the combined use of nucleus-brominated phthalic acid derivatives and polyalkylene oxides corresponding to formula (V)

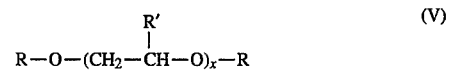

(V)

in which R, R' and x are as defined above, for stabilizing thermoplastic polycarbonates against the effects of γ-rays.

Suitable polyalkylene oxides (V) are, for example, polypropylene glycols having $\overline{M}_n$ values, as measured by GPC, in the range from 500 to 3,500 which are terminated by dihydropyran groups.

The polyalkylene oxides (V) are also incorporated in the thermoplastic polycarbonates in known manner.

Their combined incorporation with the brominated phthalic acid derivatives is also carried out in known manner.

In addition, the present invention relates to thermoplastic polycarbonates containing a combined addition of nucleus-brominated phthalic acid derivatives in quantities of 0.01% by weight to 10% by weight and preferably in quantities of 0.1% by weight to 5.0% by weight and polyalkylene oxides corresponding to formula (V) likewise in quantities of 0.01% by weight to 10% by weight and preferably in quantities of 0.1% by weight to 5.0% by weight, based on the weight of thermoplastic polycarbonate and nucleus-brominated phthalic acid derivative or on the weight of thermoplastic polycarbonate and polyalkylene oxide (V).

The present invention also relates to stabilizer combinations of nucleus-brominated phthalic acid derivatives in quantities of 0.01 to 10 parts by weight and preferably in quantities of 0.1 to 5.0 parts by weight with polyalkylene oxides (V) in quantities of 0.01 to 10 parts by weight and preferably in quantities of 0.1 to 5.0 parts by weight, the parts by weight of the components being selectable independently of one another within the defined range.

The usual additives, such as mold release agents, plasticizers, fillers and reinforcing materials, may be added in known manner to the polycarbonates to be stabilized in accordance with the invention.

The polycarbonates stabilized in accordance with the invention are processed to moldings of various kinds in known manner by extrusion or injection molding.

Suitable moldings for use in the medical field are, for example, tubes for the supply of oxygen to the blood, vessels for kidney dialysis, tube connections and cardiac probes.

The treatment of the stabilized moldings with γ-rays is carried out, for example, by irradiation with a 2 MeV van de Graff generator. This radiation source is calibrated in accordance with DIN specifications. A dose of 30 kGy (3 Mrad) can be applied in about 6 minutes. The generator produces an electron current of 100 μA. In the material, the energy loss of the electrons is brought about mainly by ionization, but also by "bremsstrahlung" (radiation due to retarding of particles). The direct access to the radiation source enables the samples to be physically examined immediately after irradiation (when the greatest changes occur). Another advantage is that the radiation parameters can be varied. With commercial radiation sterilization, such variations are difficult.

EXAMPLES

Components used:
1. Tetrabromophthalic anhydride
2. Tetrabromobisphenol A oligocarbonate having a degree of polymerization of 4 to 6.
3. Bisphenol A homopolycarbonate, $M_w$ approx. 28,000
4. Tetrachlorophthalic anhydride
5. NaBr and KBr
6. Polypropylene oxide corresponding to formula (PPG) is a dihydropyran-terminated polypropylene glycol corresponding to the formula

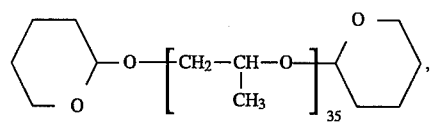

of which the production is described in EP-OS 0 296 473, Example 1.

Example 1

The additives were incorporated in a polycarbonate resin in a mixing extruder and were subsequently extruded. The extruded parts were irradiated with 3.0 Mrad. The radical concentration and the yellowness index were then measured over a period of 10 days. Table 1 shows the delta yellowness indices (delta YI) which were measured for the polycarbonate and the additive-containing compositions 3 hours and 10 days after irradiation.

The compositions containing tetrabromophthalic anhydride stabilize the polycarbonates against the effect of γ-rays distinctly better than tetrabromobisphenol oligocarbonate or other bromine-containing compounds.

TABLE 1

| Composition | Delta YI (after 3 hours) | Delta YI (after 10 days) |
|---|---|---|
| Polycarbonate component 3 (control) | 57.3 | 39.4 |
| Polycarbonate component 3 (0.5% NaBr)* | 42.6 | 26.0 |
| Polycarbonate component 3 (0.5% KBr)* | 44.7 | 23.5 |
| Polycarbonate component 3 (1.0% tetrachlorophthalic anhydride) | 41.3 | 21.4 |
| Polycarbonate component 3 (1.0 tetrabromobisphenol A oligocarbonate) | 35.4 | 19.5 |
| Polycarbonate component 3 (1.0% tetrabromophthalic anhydride)* | 23.2 | 10.7 |

*Larger quantities result in clouding of the polycarbonates

Example 2

It is generally known that the stability of a material to the effect of radiation can also be measured by determining the radical concentration of the material after irradiation. Radical concentrations can be determined inter alia by electron spin resonance methods (ESR). After irradiation, the bisphenol A polycarbonate contains a large number of radicals. The reduction in this number in stabilizer-containing polycarbonate compositions is proof of stabilizing properties. Table 2 compares the relative radical concentration of polycarbonate with compositions containing bromine as radical trapper 3 hours and 10 days after irradiation. The figures reflect the effectiveness of the tetrabromophthalic anhydride derivatives as radiation trappers.

TABLE 2

| Composition | Relative radical conc. (after 3 hours) | Relative radical conc. (after 10 days) |
|---|---|---|
| Polycarbonate component 3 | 215 581 | 19 913 |
| Polycarbonate component 3 (0.5% NaBr) | 337 958 | 16 857 |

TABLE 2-continued

| Composition | Relative radical conc. (after 3 hours) | Relative radical conc. (after 10 days) |
|---|---|---|
| Polycarbonate component 3 (0.5% KBr) | 309 337 | 23 109 |
| Polycarbonate component 3 (1.0% tetrachlorophthalic anhydride) | 332 255 | 28 347 |
| Polycarbonate component 3 (1.0% tetrabromobisphenol A oligocarbonate) | 190 901 | 12 314 |
| Polycarbonate component 3 (1.0% tetrabromophthalic anhydride)* | 26 876 | 2 292 |

Example 3

The additives were incorporated in a polycarbonate resin in a mixing extruder and were subsequently extruded. The extruded parts were irradiated with 3.0 Mrad. The radical concentration and the yellowness index were then measured over a period of 10 days. Table 1 shows the delta yellowness indices (delta YI) which were measured for the polycarbonate and the additive-containing compositions 3 hours and 10 days after irradiation. The compositions containing tetrabromophthalic anhydride stabilize the polycarbonates against the effect of γ-rays distinctly better than tetrabromobisphenol A oligocarbonate or other bromine-containing compounds.

TABLE 3

| Composition | Delta YI (after 3 hours) | Delta YI (after 10 days) |
|---|---|---|
| Polycarbonate component 3 (control) | 57.3 | 39.4 |
| Polycarbonate component 3 (1.0% component 6) | 37.5 | 19.8 |
| Polycarbonate component 3 (1.0% tetrabromobisphenol A oligocarbonate) | 30.8 | 12.6 |
| Polycarbonate component 3 (1.0% tetrachlorophthalic anhydride) | 41.3 | 19.9 |
| Polycarbonate component 3 (1.0% tetrabromobisphenol A oligocarbonate and 1% component 6) | 28.9 | 9.4 |
| Polycarbonate component 3 (1.0% tetrabromophthalic anhydride) (1.0% component 6) | 12.3 | 6.3 |

Example 4

The radical concentration is determined as in Example 2. The figures reflect the effectiveness of the tetra-bromo-bisphenol anhydride derivatives as radiation trappers.

TABLE 4

| Composition | Relative radical concentration (after 3 hours, after 10 days) | |
|---|---|---|
| Polycarbonate component 3 | 339 595 | 34 522 |
| Polycarbonate component 3 (1.0% component 6) | 255 083 | 8 212 |
| Polycarbonate component 3 (1.0% tetrabromobisphenol A oligocarbonate) | 236 388 | 8 628 |
| Polycarbonate component 3 (1.0% tetrachlorophthalic anhydride) | 333 255 | 28 347 |
| Polycarbonate component 3 (1.0% tetrabromobisphenol A oligocarbonate and 1% component 6) | 100 794 | 3 935 |
| Polycarbonate component 3 (1.0% tetrabromophthalic anhydride) (1.0% component 6) | 26 697 | 1 162 |

We claim:

1. A thermoplastic molding composition characterized by its improved stability against the effect of γ-radiation comprising an aromatic polycarbonate resin and a nucleus-brominated phthalic acid anhydride conforming to

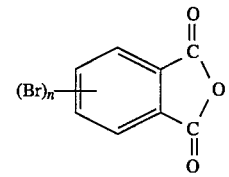

in which n is 1, 2, 3 or 4
and
0.1 to 10% relative to the weight of said composition of a polyalkylene oxide corresponding to

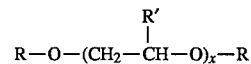

in which
R is H, $C_{1-6}$-alkyl, tetrahydropyranyl or a silyl group,
R' is H or $C_{1-6}$-alkyl and
x is an integer of 1 to 100.
said stability being greater than that imparted to the resin by said polyalkylene oxide alone.

2. The composition of claim 1 wherein said anhydride is present in an amount of 0.5 to 1.5 percent relative to the weight of said composition.

* * * * *